United States Patent [19]

Warner

[11] Patent Number: 4,527,333

[45] Date of Patent: Jul. 9, 1985

[54] DEVICE FOR INDICATING A QUANTITATIVE CHANGE IN DOT AREA OF AN IMAGE IN A PRINTING PROCESS AND THE METHOD OF MAKING THE SAME

[75] Inventor: Richard D. Warner, Burgettstown, Pa.

[73] Assignee: Graphic Arts Technical Foundation, Pittsburgh, Pa.

[21] Appl. No.: 572,930

[22] Filed: Jan. 23, 1984

[51] Int. Cl.[3] ........................ G01B 3/00

[52] U.S. Cl. ........................ 33/1 B; 33/121; 355/40

[58] Field of Search ........................ 33/1 B, 121, 122; 354/5, 8; 355/40, 77

[56] References Cited

U.S. PATENT DOCUMENTS

| | | | |
|---|---|---|---|
| 830,282 | 9/1906 | Andrews | 33/1 B |
| 1,808,123 | 6/1931 | Uher, Jr. | 355/40 |
| 2,770,044 | 11/1956 | Wood | 33/121 |
| 3,144,637 | 8/1964 | Adams et al. | 355/40 |
| 3,202,045 | 8/1965 | Arsenault et al. | 355/40 |
| 3,212,395 | 10/1965 | Barley | 355/40 |
| 3,220,301 | 11/1965 | Koonz et al. | 355/40 |
| 3,393,618 | 7/1968 | Baker | 355/40 |
| 3,609,035 | 9/1971 | Ataka | 355/40 |
| 3,620,622 | 11/1971 | Goodwin | 355/43 |
| 3,719,127 | 3/1973 | Mueller | 355/40 |
| 3,785,733 | 1/1974 | Bender | 355/77 |
| 4,143,967 | 3/1979 | Wicker | 355/77 |
| 4,183,659 | 1/1980 | Brunner | 355/40 |
| 4,388,386 | 6/1983 | King et al. | 355/40 |

FOREIGN PATENT DOCUMENTS

| | | | |
|---|---|---|---|
| 2401672 | 3/1979 | Fed. Rep. of Germany | 355/40 |

OTHER PUBLICATIONS

"The GATF Dot Gain Scale"—Graphic Arts Technical Foundation Publication No. 9-Photographic Dept. Memo No. 5.

GATF Compact Color Test Strip User's Guide.

GATF Catalog—Copyright 1982, pp. 1-34.

*Primary Examiner*—Willis Little

*Attorney, Agent, or Firm*—Stanley J. Price, Jr.

[57] ABSTRACT

A device for indicating a quantitative change in dot area of an image in a printing process and the method of making the same. The apparatus includes a square matrix array on a substrate. Four square members are provided in the matrix array on the substrate. The square members are each equal in size and have certain of their corners in juxtaposition with certain corners from other square members to form a square center opening bounded by a side from each square member. The device also includes five circular shaped members, provided in the matrix array on the substrate. The circular members are each equal in size. One of the circular members is positioned in centered, spaced relation in the center opening and the other of the circular members are each positioned in adjacent and centered, spaced relation to a pair of adjacent sides provided by the juxtaposition of the corners of the square members, with one side of the pair of adjacent sides being provided by one square member and the other side of the pair of adjacent sides being provided by another square member. The circular members are each spaced a preselected distance from an adjacent side of an adjacent square member to form a gap therebetween so that an increase in area of the squares and the circular member to the extent that the periphery of the shaped member is in juxtaposition with the sides of the squares is indicative of a predetermined change in dot area.

11 Claims, 6 Drawing Figures

DEVICE FOR INDICATING A QUANTITATIVE CHANGE IN DOT AREA OF AN IMAGE IN A PRINTING PROCESS AND THE METHOD OF MAKING THE SAME

BACKGROUND OF THE INVENTION

1. Field of the Invention

This invention relates to a quality control device that can be used in a printing process and, more particularly, to a device for indicating a quantitative change in dot area of an image in a printing process and the method of making the same.

2. Description of the Prior Art

It is common practice in the graphic arts industry to use quality control devices as targets for measuring dot gain or dot loss by using various commercially available transmission and reflection densitometers. These quality control devices normally require a field of measurement of at least 0.125 inch in diameter to accommodate the field of view on commercially available densitometers. Other various quality control devices are known which indicate dot gain or dot loss in a qualitative mode to provide a subjective and relative and not an absolute measurement of dot gain or dot loss. Normally, most commercially available visual quality control devices for providing a subjective measurement of dot gain or dot loss generally require at least a 0.125 inch diameter field of view to be effective.

Other quality control devices are known for monitoring the dimensions of an image in a printing process. For example, German Auslegeschrift No. 2,401,672 to Brunner discloses a device for monitoring the dimensions of an image to be processed in a reproduction and printing process and a method for making the disclosed device. Brunner's device for monitoring the dimensions of an image composed of screen dots includes at least one measuring element provided on a substrate and includes at least one measuring symbol which permits conclusions to changes of the image during the printing process. The measuring symbol is designed so that the disappearance of a portion thereof directly constitutes a measure of the relative decrease in area of the screen dots of the image. Brunner's device may also include a second measuring symbol arranged adjacent to the aforementioned measuring symbol and being complementary thereto such that the disappearance of the second measuring symbol of the pair of measuring symbols is a measure of the relative increase in area of the screen dots.

U.S. Pat. No. 4,183,659 to Brunner discloses a means for controlling the change of thickness of lines of photographically produced briefs which are produced by the agency of a means for photographic reproduction. A control area means is provided including at least two area element means, whereby the smallest width of which and the smallest mutual distance of which correspond to the tolerance of the thickness of lines of a print.

U.S. Pat. No. 4,143,967 to Wicker discloses a method of producing an invisible photograph, latent in form, by the use of a dark screen and a method of viewing the photograph either by utilizing the same dark screen, or by making a print of the photograph by an offset printing process and then appropriately reproducing the print. Wicker's invention describes a method of halftone photography which uses an extremely dark screen to produce a halftone having micro-miniaturized positive dots containing a negative and a positive halftone image separated by a difference of 30°. This separation renders the visible halftones invisible or latent.

U.S. Pat. No. 3,202,045 to Arsenault et al. discloses an apparatus for simultaneously recording space data and code on a single frame of photographic film. Arsenault's invention discloses a means by which a document may be recorded in one area on a frame of film and a block of code identifying the document may be recorded in a second defined area on the frame of film alongside the first.

U.S. Pat. No. 3,220,301 to Koonz et al. discloses a coding and photographic device and relates to the filing and retrieval of documentary information. Koonz et al. discloses an information storage medium in the form of a card or film having an area adapted to store printed information in reduced form and another area having groups of visually readable characters displayed thereon with each character having aligned therewith an area displaying a machine readable code.

U.S. Pat. No. 3,212,395 to Bailey discloses a camera digital display. Bailey's invention relates to the filing and retrieval of documentary information and to an apparatus for recording information on a storage medium. The purpose of the device in Bailey is to produce a reduced size photographic film of documents together with coding for operating suitable photoelectric sensing means to allow machine filing and retrieval using the coding.

U.S. Pat. No. 3,393,618 to Baker discloses a printing control. Baker discloses a stencil for use in preparing printing plates and for use in controlling the quality of the plates and resultant prints therefrom. The stencil has a light transmitting image to provide on the plates or prints therefrom a monotone reference indication or comparable patterns with the monotone reference indication indicating a predetermined plate or print quality and the comparable patterns indicating plate or print quality differing from the predetermined quality.

The publication *Research Progress* published by the Graphic Arts Technical Foundation in the article "The GATF Dot Gain Scale" by Frank Preucil et al., number 69, pp. 1–4 (November, 1965) discusses the Graphic Arts Technical Foundation Dot Gain Scale. This Dot Gain Scale is described as a visual device made up of ten steps graduated in density in the form of numbers from 0–9 designed to give numerical values to dot sharpening or dot gain. Dot area changes are indicated by the displacement of an "invisible number" to a higher or lower value.

What is needed, therefore, is a visual quality control device, under appropriate magnification, that can be used in a printing process, such as a halftone printing process, to quantitatively determine changes in dot area. What is further needed is a device for indicating a quantitative change in dot area of an image in a printing process that requires an area generally significantly smaller than the area needed by various available commercial dot gain devices to measure dot gain or loss using densitometric or visual methods. What is also needed is a microsize device which is not readily visible at normal viewing distances which can serve to protect against illegal copying or reproduction of original documents that are not to be duplicated or reproduced. What is additionally needed is a device and method for easily and accurately determining a specific quantitative change in dot area.

SUMMARY OF THE INVENTION

In accordance with the present invention, there is provided a device and method for indicating a quantitative change in dot area of an image in a printing process. In the device according to the present invention, a square matrix array is provided on a substrate. Four square members are provided in the matrix array on the substrate each having four sides which intersect to form four corners thereof. These square members are each substantially equal in size and each side of each square member is substantially of a preselected dimension. Each square member has a corner thereof in juxtaposition with a corner from one square member and another corner thereof in juxtaposition with a corner of another square member to provide a substantially square center opening bounded by a side of each square member. The device includes at least one shaped member in the matrix array on the substrate.

Where uniformly shaped members are positioned in more than one opening the uniformly shaped members are equal in size. A substantially uniformly shaped member may also be positioned within the center opening in a centered, spaced relation with the sides of the square members providing the center opening. Each other of the substantially uniformly shaped members is positioned in adjacent and centered, spaced relation to a pair of adjacent sides provided by the juxtaposition of the corners of the square members, with one side of a pair of adjacent sides being provided by one square member and the other side of the pair of adjacent sides being provided by another square member. Each substantially uniformly shaped member is spaced the same preselected distance from an adjacent side thereto of an adjacent square member. Each preselected distance is the substantially perpendicular distance between an adjacent side and a line substantially parallel to the adjacent side tangent to the substantially uniformly shaped member on the periphery of the substantially uniformly shaped member nearest the adjacent side. The preselected distances define gaps between each substantially uniformly shaped member and the sides of the square members adjacent thereto, each preselected distance being indicative of a specific quantitative change in dot area. The substantially uniformly shaped members may be circular members.

The present invention also includes a method for making a device to indicate a quantitative change in dot area of an image in a printing process. In the method, a substrate is provided. Four square members are provided on the substrate. The square members are each substantially equal in size and each square member has four sides which intersect to form four corners and each side of each square member is of a preselected dimension. The square members are arranged on the substrate with each square member having a corner thereof in juxtaposition with a corner from one square member and another corner thereof in juxtaposition with a corner from another square member to provide a substantially square center opening bounded by a side from each square member and provide four corner openings each bounded by a pair of adjacent sides provided by the juxtaposition of the corners of the square members. One side of each pair of adjacent sides is provided by one square member and the other side of each pair of adjacent sides is provided by another square member. At least one substantially uniformly shaped member is provided on the substrate in any of the openings formed by the juxtaposition of the corners of the square members. Each substantially uniformly shaped member is positioned in centered, spaced relation to the adjacent sides of the adjacent square members to provide gaps of preselected distances between each substantially uniformly shaped member and the adjacent sides of the adjacent square members. Each preselected distance is the substantially perpendicular distance between an adjacent side of an adjacent square member and the tangent to the substantially uniformly shaped member substantially parallel to the adjacent side required for the tangent to touch the adjacent side of an adjacent square member at a specific quantitative change in dot area.

In the method, a plurality of substantially uniformly shaped members of substantially equal sides can be provided, with five substantially uniformly shaped members desirably being provided.

The method of the present invention also includes substantially circular members positioned in the openings provided by the squares. With a substantially circular member or members the method includes adjusting the area of each substantially circular member in relation to the area of each square member by the relationship $d'=d+(x-d)$ (cos $\theta$), where d' is the preselected diameter of each substantially circular member, d is the expected diameter of the substantially circular member at a given dot area for a specific quantitative change in dot area, x is the preselected dimension of each side of each square member, and $\theta$ is the angle at which the centers of the circular members are arranged relative to the vertical sides of the squares.

Accordingly, an object of the present invention is to provide a device for indicating a quantitative change in dot area of an image in a printing process.

An additional object of the present invention is to provide a device for determining a quantitative change in dot area that requires an area generally significantly smaller than the area needed by most commercially available dot gain devices to measure dot gain or dot loss using densitometric or visual methods.

A further object of the present invention is to provide a visual quality control device which can easily and accurately determine a specific quantitative change in dot area.

Another object of the present invention is to provide a device which can be of a micro-size which is not readily visible at normal viewing distances which can serve to protect against illegal copying or reproduction of original documents that are not to be duplicated or reproduced.

Another object of this invention is to provide a method of making a device for indicating a quantitative change in dot area of an image by positioning an array of squares on a substrate and positioning uniformly shaped members in one or more of the openings provided by the squares.

These and other objects of the present invention will be more completely disclosed and described in the following specification, the accompanying drawings, and the appended claims.

DESCRIPTION OF THE PREFERRED EMBODIMENT

Figure 1:
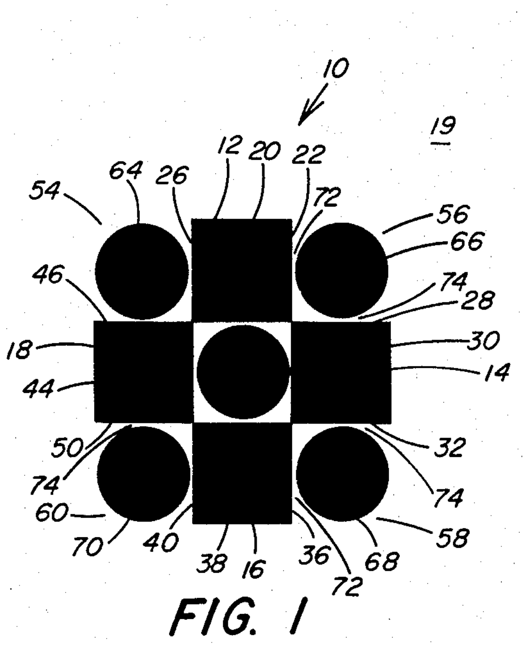
FIG. 1 illustrates an enlarged illustration of the device of the present invention for indicating a quantitative change in dot area of an image in a printing process.
Figure 2:
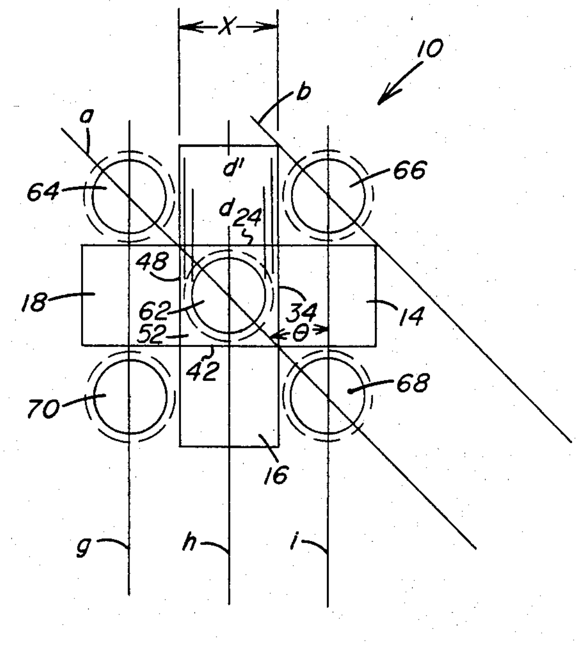
FIG. 2 is a line drawing of the device illustrated in FIG. 1 with the solid portions of the squares and circles omitted to provide more detailed identification of the elements by numerals and illustrates the adjusting the area of each substantially circular member in relation to the area of the square members by adjusting the expected dimensions of the substantially circular members.

Referring to FIGS. 1 and 2, there is illustrated a device 10 of the present invention for indicating a quantitative change in dot area of an image in a printing process. Device 10 would typically be used, for example, in a halftone printing process to quantitatively determine the changes in halftone dot area as an indicator of an increase or decrease in dot area for graphic arts films, prepress proofs, printing plates and printed press sheets, suitable photomechanical processes, and the like.

Device 10 includes four solid square members, or square dots, 12, 14, 16, and 18 arranged in a matrix array on a substrate 19.

Each solid square member has four sides which intersect to form four corners for each square member. Square member 12 has sides 20, 22, 24, and 26; square member 14 has sides 28, 30, 32, and 34; square member 16 has sides 36, 38, 40, and 42; and square member 18 has sides 44, 46, 48, and 50. Square members 12, 14, 16, and 18 are substantially equal in size with each side of each square member being substantially of a preselected dimension.

Each square member 12, 14, 16, and 18 of device 10 has a corner thereof in juxtaposition with a corner of one square member and another corner thereof in juxtaposition with a corner of another square member to provide a substantially square center opening 52 bounded by sides 24, 34, 42, and 48 of the square members 12, 14, 16 and 18, respectively. For example, square member 12 has intersecting sides 22 and 24 forming a corner in juxtaposition with a corner of square member 14 formed by the intersection of sides 28 and 34. Additionally, the intersection of sides 34 and 32 form a corner in juxtaposition with a corner formed by the intersection of sides 36 and 42 of square member 16; the intersection of sides 40 and 42 of square member 16 form a corner in juxtaposition with a corner formed by the intersection of sides 48 and 50 of square member 18; and the intersection of sides 46 and 48 of square member 18 form a corner in juxtaposition with a corner formed by the intersection of sides 24 and 26 of square member 12. This juxtaposition of corners also provides corner openings 54, 56, 58, and 60 in the matrix array of device 10.

In corner openings 54, 56, 58, and 60, respectively, there are positioned solid substantially circular members 64, 66, 68, and 70 which are equal in size. A substantially circular member 62 is positioned within center opening 52 in a centered, spaced relation with sides 24, 34, 42 and 48 of square members 12, 14, 16, and 18. Gaps are present between the circular member and the adjacent sides of the squares similar to gaps 72 and 74 later discussed. Circular members 64, 66, 68 and 70 are each positioned in adjacent and centered, spaced relation to a pair of sides bounding corner openings 54, 56, 58, and 60, respectively. The respective pairs of sides are formed from the juxtaposition of the corners of the square members.

The circular member 64 is positioned in adjacent and centered, spaced relation to sides 26 and 46. Circular member 66 is placed in adjacent and centered, spaced relation to sides 22 and 28 with a gap 72 between the side 22 and the circular member 66. Another gap 74 is formed between the side 28 and the circular member 66. Circular member 68 is placed in centered, spaced relation to sides 32 and 36; and substantially circular member 70 is placed in adjacent and centered, spaced relation to sides 40 and 50. Gaps similar to gaps 72 and 74 are formed between the respective circular members and the adjacent sides of the squares.

In determining a specific quantitative change in dot area at a given dot area, such as at the 50% dot area, the area of each of the square members, or square dots, is interrelated to the area of the substantially circular members, or substantially circular dots, and to the substantially perpendicular distances or gaps between the respective sides of the square members and the respective tangents to the substantially circular members adjacent to the respective sides of the square members, each tangent being substantially parallel to the respective adjacent side of an adjacent square member. These areas are interrelated to provide gaps therebetween so that a specific percentage of dot gain causes the adjacent sides of the square members to touch the respective substantially circular members at the respective tangents to the substantially circular members, each tangent being substantially parallel to the respective adjacent side of an adjacent square member. Further increase in dot gain will further merge the sides of the square members and the circumference of the circular members adjacent thereto to overlap portions of the circles and squares as later discussed.

The square members and circular members are also interrelated so that a specific percentage of dot loss, if, for example, a negative image of device 10 was used on a positive working material, would cause the gaps between the adjacent sides of the square members and the aforementioned tangents to the respective substantially circular members to disappear by the touching of the respective tangents and the respective adjacent sides of the square members.

Normally, in interrelating the areas of the square members and substantially circular members of device 10 to ascertain various specific percentages of dot loss or dot gain at a given dot area, such as at the 50% dot area, the area of each of the square members and the area of each of the substantially circular members is determined by the amount of dot loss or dot gain to be measured by a merging or contacting of the substantially circular members with the respective square members.

Each substantially circular member is positioned a preselected distance from each adjacent side of each adjacent square member. The preselected distances define gaps between each substantially circular member and the sides of the square members adjacent thereto. Each preselected distance is the substantially perpendicular distance between an adjacent side of an adjacent square member to a substantially circular member and a line substantially parallel to the adjacent side tangent to the substantially circular member on the periphery of the substantially circular member nearest the adjacent side.

In determining a given level of dot gain or dot loss at a given dot area in the matrix array of device 10, such as at the 50% dot area, both the radii of the substantially circular members and the gap distances, or preselected distances, are considered. At a given dot area, the area of the substantially circular members is varied by either increasing or decreasing the radii of the respective circular members to provide for a given level of dot area gain or dot area loss, such as 2%, 5%, 10% or 20% dot area gain or dot area loss at the 50% dot area. In so varying the radii of the circular members, the centers of the circular members are held constant at a given percent dot area. So adjusting the radii correspondingly adjusts the gap distances between the square members and the circular members to provide preselected distances or gaps between the square members and the circular members.

The use of circular members with the square members in the matrix array of device 10, enhances the sensitivity of device 10 to indicate a specific quantitative change in dot area, since a "point-line" contact occurs when the square members and the respective circular members touch to indicate a specific quantitative change in dot area gain or dot area loss. The "point" of a "point-line" contact is a tangent to a circular member parallel to an adjacent side of an adjacent square member and the "line" of a "point-line" contact is the respective adjacent side of the adjacent square member that touches the tangent to the circular member at a specific quantitative change in dot area gain or loss.

Figure 3:
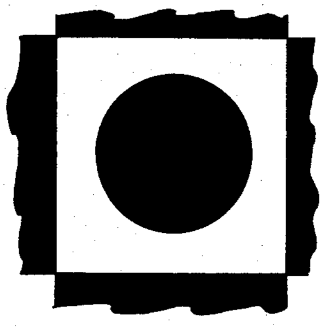
FIGS. 3, 4 and 5 are fragmentary views of the center portion of the device illustrating the manner that both the square members and the circular dot member expand or increase in size resulting from a change in dot area.

FIGS. 3–6 diagrammatically illustrate the sensitivity of the device 10. FIG. 3 illustrates the center circular member with a preselected gap between the circular member and the sides of the squares. As previously discussed the size of the gap is selected to that the growth of the squares and circle to close the gap will indicate a given dot area gain or dot area loss which the device 10 is designed to measure, as for example a 5% dot area gain or dot area loss.

Figure 4:
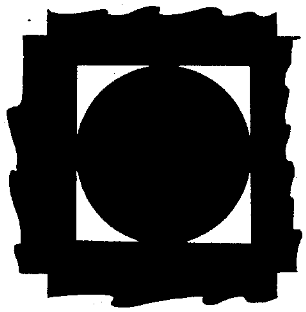
Figure 5:
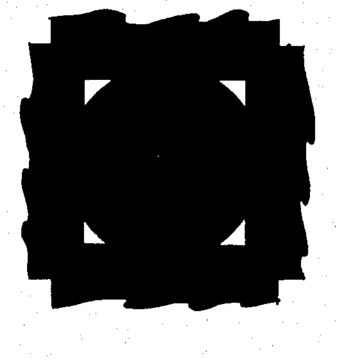

FIG. 4 illustrates the "point-line" contact when the device 10 indicates the precise dot area gain which the device 10 is designed to measure. FIG. 5 illustrates a dot area gain that is in excess of the dot area gain which the device is designed to measure. In FIG. 4, both the squares and the circular member have grown to the extent that the edge or circumference of the circular dot contacts or touches the side of the square. It should be noted at this precise dot area gain closer areas remain at the corner areas of the blank square in which the circular dot is positioned. When the dot area gain exceeds the precise dot area gain illustrated in FIG. 4, the squares and circle have grown so that there is an overlapping of the circle and squares. The extent of growth is indicated by the size and configuration of the clear areas in the corners. A comparison of FIGS. 4 and 5 demonstrate the change in size of these clear areas. Where the dot area gain is greater than that illustrated in FIG. 5 the overlap of the circular dot and the sides of the squares is such that the clear areas disappear.

Figure 6:
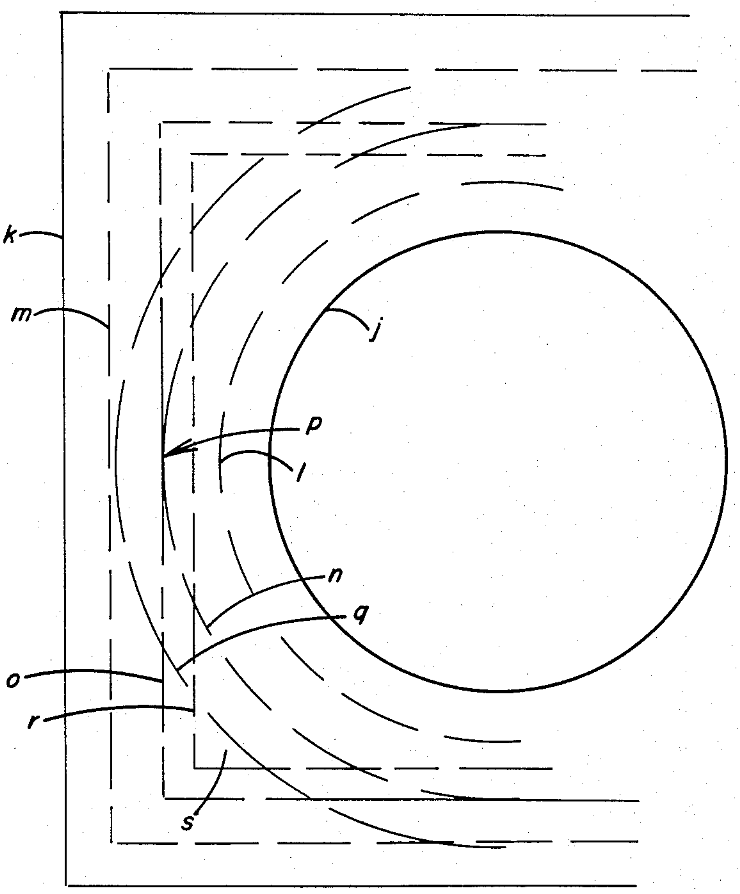
FIG. 6 is a diagrammatic illustration of the sides of the square members and the circular dot member with dash lines indicating the growth of both the squares an the circular dot member resulting from a change in dot area.

FIG. 6 is intended to diagrammatically illustrate the dot area gain. The letter j designates the circumference of the solid circular dot and the letter k designates the side of a square with a preselected distance or gap therebetween for a preselected dot area gain which the device is designed to measure. When the size of the circular dot and the squares have increased to the size indicated by the dash lines identified by the letters l and m a gap still remains between the circular dot and the side of the square. This indicates that the dot area gain is less than the preselected dot area gain which the device has been designed to measure.

When the size of the circular dot and the squares have increased to the size indicated by dash lines n and o the circular dot touches the side of the square at point p. A "point-line" contact is made between the circular dot and square. It is at this size of the circular dot and square that the exact or precise dot area gain which the device is designed to measure has occurred. The size of the clear areas are apparent from the spaces between lines n and o above and below the "point-line" contact.

When the dot area gain is greater than the precise dot area gain which the device is designed to measure, the circular dot and the squares overlap as illustrated by the dash lines q and r. The clear areas decrease in size as illustrated, and if the dot area gain is greater than illustrated, the clear areas disappear because of the extent of overlap.

In the device 10, all such preselected distances between the substantially circular members and the respective adjacent sides are generally equal at a given level of dot gain or dot loss to be measured. Gaps 72 and 74 in FIGS. 1 and 2 illustrate the preselected distances or gaps between circular member 66 and adjacent sides 22 and 28 of square members 12 and 14. Similar gaps are present between the other circular members and the sides of the squares.

Each preselected distance is indicative of a specific quantitative change in dot area, since it is the distance required for a tangent to a substantially circular member substantially parallel to an adjacent side of an adjacent square member to touch the adjacent side if a given dot gain is reached at a given dot area, such as at the 50% dot area, for example. In determining the required area of the substantially circular members in relation to the normally constant area of the square members for device 10 to indicate a specific quantitative change in dot area, it is important to remember that the substantially circular members are read at a different ruling than the square members. The substantially circular members are normally read at a ruling at a 45° angle to a vertical axis to the square members. Therefore, the various preselected distances and the areas of the substantially circular members must be appropriately adjusted to account for this difference in ruling.

Referring to FIG. 2, device 10 is shown to illustrate the adjustment of the area of each substantially circular member in relation to the area of the square members by adjusting the dimension of the circular members and thus the preselected distance, or gap distance, to take into consideration the above-mentioned difference in ruling between the square members and the circular members to determine the dot area gain and loss at a given dot area. It was found that correction of the dimension of the circular members is necessary to equate the difference in ruling between the square members and the circular members so that a true dot area gain or dot area loss is indicated.

FIG. 2 shows a diagonal axis a passing through the centers of substantially circular members 62, 64, and 68. A line b parallel to diagonal axis a is shown passing through the center of substantially circular member 66.

Vertical axes g, h, and i are also shown in FIG. 2. Vertical axis g passes through the center of substantially circular members 64 and 70 and the center of square member 18; vertical axis h passes through the centers of square members 12 and 16 and through the center of circular member 62; and vertical axis i passes through the centers of substantially circular members 66 and 68 and through the center of square member 14. Axes a, g, h, i and line b are shown with device 10 in FIG. 2 for illustrative purposes and are not a part of device 10 of the present invention.

The distance "x" in FIG. 2 is the preselected dimension for each side of each square member in device 10. The distance "d" is the expected diameter of a substantially circular member at a given dot area for a specific quantitative change in dot area, such as a 5% dot gain at the 50% dot area. An angle $\theta$ at which the substantially circular members are read is shown in FIG. 2 at the intersection of diagonal axis a and vertical axis i. The distance d' is the diameter of a substantially circular member required to equate the difference in ruling between the square members and the substantially circular members to permit a true dot area gain or dot area loss at a given dot area to be indicated when a tangent to a circular member parallel to an adjacent side of an adjacent square member and the adjacent side of the adjacent square member touch. The distance d' is determined from the distance "d" and "x" and the angle $\theta$ by the following equation:

$$d' = d + (x - d)\ (\cos\theta).$$

For example, at the 50% dot area of 0% dot gain at a ruling of 150 lines per inch read at 0% dot gain the square members have the dimension of "x" equal to about 1/150 inch or about 0.006633 inch, the expected diameter distance "d" of the substantially circular members required would be computed, as known to those skilled in the art, as:

$$d = \sqrt{\frac{\text{Dot area/in}^2}{(\text{lines/in})^2} \cdot \frac{4}{\pi}} = .005319$$

At 0% dot gain it would be expected that the gap distance, or preselected distance, would be zero and the substantially circular members and the respective adjacent sides of the adjacent square members would initially touch. However, the quantity $x - d = 0.006633$ in. $-$ 0.005319 in. $=$ 0.0013 in. The preselected distance, or gap distance, between the tangents to the circular members parallel to the respective adjacent sides of the adjacent square members and the respective adjacent sides would have to be decreased by about 0.0013/2 in. or about 0.00065 in., and the expected diameter d would have to be increased to account for the difference in ruling between the square members and the substantially circular members, the substantially circular members being read at an angle $\theta$ of 45° to the vertical.

In a 5% dot area gain at the 50% dot area at a ruling of 150 lines per inch for the square members which are read at 0°, the distance x, the preselected dimension of each side of each square member, is 0.006633 inch or 1/150 inch. A circular member, or dot, having a 40% dot area would have an expected diameter d equal to about 0.00476 inch. However, the substantially circular members are read in this example at a ruling at an angle $\theta$ equal to substantially 45°. Therefore, the expected diameter d of the substantially circular members must be increased to a diameter d' equal to 0.0060842 in. to account for this difference in ruling at which the substantially circular members are read. The diameter d' is arrived at by applying the aforementioned equation:

$$0.00476 \text{ in.} + (0.006633 \text{ in.} - 0.00476 \text{ in.})\ (\cos 45°) = d'$$

$$0.00476 \text{ in.} + (0.001873 \text{ in.})(0.707) = 0.0060842 \text{ in.}$$

The ruling of the substantially circular members is read in this example at 100 lines/inch at an angle 74 equal to 45°, such as read between diagonal axis a and line b.

The device of the present invention similar to device 10 of FIG. 1 may be used with only one circular member in the matrix array and may be located in the center opening. If, for example, a preselected dot gain is achieved, the substantially circular member would tangentially touch, as previously described herein, the adjacent sides of the adjacent square members to form a cross-like pattern.

Likewise, the device of the present invention may be used with only circular members 64, 66, 68 and 70. When, for example the specified amount of dot gain is reached, the substantially circular members would tangentially touch, as previously described herein, the respective adjacent sides of the adjacent square members and the center opening would be correspondingly reduced by the corresponding dot gain of the square members.

While the examples and discussion herein have centered upon determining when a quantitative change in dot area has occurred at the 50% dot area, similar matrix arrays of the invention to device 10 of the figure, for example, can be made to indicate a quantitative change in dot area at substantially any desired point in the halftone reproduction scale. Further, a plurality of devices of the present invention can be used side by side to determine various specific quantitative changes in dot area at a given dot area. Such devices, as device 10, may be grouped so as to indicate, for example, a 2%, 5%, 10% or 20% change, increase or decrease, in dot area. Additionally, while device 10 of the figure has been discussed in the form of a square matrix array including square members, or square dots, with circular members, or dots, superimposed in the matrix array of device 10, the substantially circular members can have other uniform shapes or configurations, and provide the desired determination of dot gain or dot loss.

A particular advantage of the device of the present invention is that it requires a space generally significantly smaller than the space needed by various commercially available dot gain devices to measure dot gain or loss using densitometric or visual methods. For example, a typical configuration of device 10 of the figure to visually measure dot gain at the 50% dot area would have a size at 150 lines/inch screen ruling of about 0.00039204 square inches. Typically, a device of the present invention can desirably be made in a size of about one-tenth the size of commercially available quality control devices used to monitor dot gain or loss. At such size, the device of the present invention would normally not be conspicious or objectionable in its physical appearance on most final printed products. The device of the present invention can be made small enough to appear in the gutter of a web signature or fold of a publication where it is hidden in the final printed product. Thus, the device of the present invention does not waste any usable areas of the printing substrate on which it is provided.

Additionally, the micro-size to which a device of the present invention can be made would not be readily visible at normal viewing distances. As such, it can be used as a device for protection against illegal copying or reproduction of original documents that are not to be duplicated or reproduced.

The device of the present invention is generally most suitable in printing or photomechanical processes where resolutions of from about 1 line/inch to about 300 lines/inch need to be measured.

According to the provisions of the patent statutes, I have explained the principle, preferred construction and mode of operation of my invention, and have illustrated and described what I now consider to represent its best embodiments. However, it should be understood that, within the scope of the appended claims, the invention may be practiced otherwise than as specifically illustrated and described.

I claim:

1. A device for indicating a quantitative change in dot area of an image in a printing process comprising, four square members positioned on a substrate, each of said square members having four intersecting sides to form four corners for each square, each of said square members being substantially equal in size with each side of a preselected dimension, each of said square members having one corner in juxtaposition with a corner from another square member to form a square center opening bounded by a side from each of said square members and four corner openings defined by sides of adjacent squares, at least one shaped member positioned in one of said openings on said substrate in spaced relation to an adjacent side of said square, and said shaped member spaced from at least one of said adjacent sides of said squares a preselected distance and forming a gap therebetween so that an increase in area of said squares and said shaped member to the extent that said shaped member is in juxtaposition with said side of said square being indicative of a predetermined change in dot area.

2. A device for indicating a quantitative change in dot area of an image in a printing process as set forth in claim 1 which includes, a plurality of uniformly shaped members, each of said uniformly shaped members positioned in separate openings on said substrate in spaced relation to the adjacent sides of said squares, and each of said uniformly shaped members spaced from at least one of said adjacent sides of said squares a preselected distance and forming uniform gaps therebetween.

3. A device for indicating a quantitative change in dot area of an image in a printing process as set forth in claim 2 which includes, each of said uniformly shaped members spaced from said adjacent sides of said squares a preselected distance to form uniform gaps therebetween.

4. A device for indicating a quantitative change in dot area of an image in a printing process as set forth in claim 1 which includes, five uniformly shaped members positioned in separate openings on said substrate in spaced relation to the adjacent sides of said squares, and said uniformly shaped members spaced from said adjacent sides of said squares a preselected distance and forming uniform gaps therebetween.

5. A device for indicating a quantitative change in dot area of an image in a printing process as set forth in claim 1 which includes, at least one circular shaped member having an outer circular periphery, and said circular shaped member spaced from at least one side of a square member forming a gap therebetween so that an increase in area of said squares and said circular shaped member to the extent that the periphery of said circular shaped member is in juxtaposition with said side of said square being indicative of a predetermined change in dot area.

6. A device for indicating a quantitative change in dot area of an image in a printing process as set forth in claim 1 which includes, five circular shaped members having the same diameter and an outer circular periphery positioned in separate openings on said substrate in spaced relation to the adjacent sides of said squares, and said circular shaped members spaced uniformly from said adjacent sides of said squares a preselected distance and forming uniform gaps therebetween so that an increase in area of said squares and said circular shaped members to the extent that the periphery of said circular shaped members is in juxtaposition with said sides of said squares being indicative of a predetermined change in dot area.

7. A device for indicating a quantitative change in dot area of an image in a printing process comprising, a pair of non-circular members having sides in angular relation to each other positioned on a substrate, said non-circular member sides having ends in juxtaposition and forming an opening along the sides, a circular shaped member having an outer periphery positioned in said opening on said substrate in spaced relation to said sides of said non-circular members, and said circular members spaced from at least one of said sides of said non-circular members a preselected distance and forming a gap therebetween so that an increase in area of said non-circular member and said circular member to the extent that the periphery of said circular shaped member is in juxtaposition with said side being indicative of a predetermined change in dot area.

8. A method for making a device for indicating a quantitative change in dot area of an image in a printing process comprising, forming four square members on a substrate in a manner that each of said square members has four intersecting sides and four corners, said square members being substantially equal in size, said square members positioned with one corner in juxtaposition with a corner of another square member and forming a square center opening and four corner openings on said substrate, and positioning at least one shaped member on said substrate in one of said openings with said shaped members spaced from at least one of said adjacent sides of said squares a preselected distance to form a gap therebetween so that an increase in area of said squares and said shaped member to the extent that said shaped member is in juxtaposition with said side of said square being indicative of a predetermined change in dot area.

9. A method for making a device for indicating a quantitative change in dot area of an image in a printing process as set forth in claim 8 which includes, positioning at least one circular shaped member having an outer periphery in one of said openings in spaced relation to at least one side of a square member and forming a gap therebetween so that an increase in area of said square members and said circular shaped member to the extent that said circular shaped member is in juxtaposition with said side of said square being indicative of a predetermined change in dot area.

10. A method for making a device for indicating a quantitative change in dot area of an image in a printing process as set forth in claim 8 which includes, positioning five circular shaped members having the same diameter and an outer periphery in separate openings on said substrate in spaced relation to the adjacent sides of said squares, and said circular shaped members having a diameter so that said circular members are uniformly spaced from adjacent sides of said squares a preselected distance and form uniform gaps therebetween so that an increase in area of said squares and said shaped member to the extent that said shaped member is in juxtaposition with said side of said square being indicative of a predetermined change in dot area.

11. A method for making a device for indicating a quantitative change in dot area of an image in a printing process comprising, forming four square members on a substrate in a manner that each of said square members has four intersecting sides and four corners, said square members being substantially equal in size and each having the same preselected side dimension, said square members positioned with one corner in juxtaposition with a corner of another square member and forming a square center opening and four corner openings on said substrate, determining the diameter of circular shaped members relative to the side dimension of said square member by the relationship $$d' = d + (x - d)(\cos\theta)$$

where:

d' is the diameter to determine a preselected gain in dot area d is the expected diameter of the circular shaped member at a given dot area for said preselected change in dot area x is the preselected dimension of one of the sides of a square member $\theta$ is the angle at which the ruling of the circular member is read to the vertical sides of the squares positioning five circular shaped members having a diameter obtained by the above relationship in said openings on said substrate, and said circular shaped members having a diameter to provide uniform gaps between the periphery of said circular members and the adjacent sides of said squares so that an increase in area of said squares and said circular member to the extent that said circular member is in juxtaposition with said side of said square being indicative of a predetermined change in dot area.

* * * * *